US005802056A

United States Patent [19]

Ferguson et al.

[11] Patent Number: 5,802,056
[45] Date of Patent: Sep. 1, 1998

[54] CONFIGURATION OF VIRTUAL RINGS IN A TOKEN RING LOCAL AREA NETWORK

[75] Inventors: H. Earl Ferguson, Sunnyvale; Bobby R. Johnson, Jr., San Jose; Randy Ryals, Menlo Park, all of Calif.

[73] Assignee: Bay Networks, Inc., Santa Clara, Calif.

[21] Appl. No.: 679,090

[22] Filed: Jul. 12, 1996

Related U.S. Application Data

[60] Provisional application No. 60/001,118 Jul. 12, 1995.
[51] Int. Cl.[6] ............................................... H04L 12/28
[52] U.S. Cl. .................................... 370/403; 370/401
[58] Field of Search ........................ 370/395, 398, 370/401, 402, 403, 404, 405, 465, 466, 469, 901, 903, 905, 909, 911, 406

[56] References Cited

U.S. PATENT DOCUMENTS

5,394,402  2/1995  Ross .................................. 370/402
5,471,472  11/1995  McClure et al. .................. 370/402
5,490,140  2/1996  Abensour et al. ................ 370/352
5,490,252  2/1996  Macera et al. .................... 370/402
5,588,119  12/1996  Vincent et al. ................... 370/403

*Primary Examiner*—Wellington Chin
*Assistant Examiner*—Soon-Dong Hyun
*Attorney, Agent, or Firm*—Blakely, Sokoloff, Taylor & Zafman, LLP

[57] ABSTRACT

A token ring network having virtual token rings comprised of one or more physical token rings. A media access control (MAC) layer device such as a bridge or switching hub has at least two ports assigned the same ring number such that token ring segments connected to the ports operate as though on the same physical token ring segment even though they are electrically isolated. All physical rings in the same virtual ring are considered to be in the same broadcast domain.

11 Claims, 6 Drawing Sheets

CONFIGURATION OF VIRTUAL RINGS IN A TOKEN RING LOCAL AREA NETWORK

The patent application claims the benefit of U.S. Provisional application Ser. No. 08/001,118, filed Jul. 12, 1995.

COPYRIGHT NOTICE

Contained herein is material which is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to the field of computer networking, specifically to the field of internetworking communications among local area networks (LANs). More specifically, the present invention relates to methods and apparatus providing for virtual local area network segments in a IEEE 802.5 Token ring LAN internetworking environment.

2. Description of the Related Art

Token ring networks are well-known in the art and are described in, for example, the IEEE standard 802.5. Generally, token ring networks provide for transmission of a token from device to device in a network. When a device, such as an end user station or a switching hub, is in possession of the token, it may transmit messages onto the communication media. A basic advantage of this networking scheme is that access to the communication media is deterministic and, therefore, collisions are avoided.

Token ring LANs ("rings") may be connected together through media access control (MAC) layer bridging devices, either source route, transparent, or source route transparent bridges, thereby forming an internetwork of rings. An internetwork utilizing source route bridges and source routing allows a data terminal equipment (DTE) device coupled to and communicating on one ring to specify within the header of a data packet the route for the data packet to take to reach a destination DTE device on another ring in the internetwork.

More specifically, the route is defined by the source DTE, i.e., the DTE sending a data packet, in the routing information field in the header portion of the data packet. The route consists of a series of ring and bridge numbers identifying the series of rings and source route bridges (in the correct order) that the data packet must traverse to reach the destination DTE, i.e., the DTE receiving the data packet. Each source route bridge in the route looks at the routing information field (RIF) in the data packet and decides to forward the packet to the next ring in the route according to the route information in the RIF of the data packet.

As is well known to one of ordinary skill in the related art, one problem with source route bridging is that the number of "hops", i.e., the number of rings, between the ring on which the source DTE is attached and the ring on which the destination DTE is attached is limited based on the size of the routing information field. The RIF can only carry so much routing information—8 or 13 ring/bridge number pairs, depending on the source routing driver software present in the DTEs. As a result, large networks utilizing source route bridging are difficult to configure such that all DTEs are able to communicate with one another within the limited number of hops that may be specified in the data packets.

In addition, in a source routed network (a network utilizing source route bridges and source routing), when a source DTE attempts to locate a destination DTE, it does so by transmitting an explorer packet. Generally, the explorer packet is flooded, i.e., it traverses all rings in the internetwork, to assure that the packet will reach its intended destination. During this explorer process, the source route bridges along the route which the explorer packet takes record the routing information in the RIF. This exploration process consumes network bandwidth.

Further, some applications (such as multimedia applications) use multicast packets which are delivered to more than one destination DTE, or node. Unless all of the destination nodes in a network utilizing source route or transparent bridging are known to be on the local token ring LAN segment, explorer packets must be sent throughout the internetwork to each of the destinations. This process again consumes network bandwidth.

Further, due to congestion as a result of a large number of DTEs sharing the same physical token ring LAN, it may become desirable or necessary to divide the DTEs on the single physical ring into two or more physical rings in order to alleviate bottlenecks on the original ring. The process of splitting a single physical ring into multiple rings can cause network management issues in either a transparent or source route bridging environment.

Thus, what is desired is an improved method of transmitting data packets in a token ring local area network and internetworking environment.

SUMMARY OF THE INVENTION

An improved token ring network is described. In the described invention, a virtual ring is implemented. The virtual ring is a method of logically segmenting all nodes in a token ring environment into one or more groups. This is accomplished by assigning all the nodes in a group a single physical ring number, notwithstanding the fact that the nodes may actually be attached to different physical token ring local area networks. A switching hub, or simply, switch, is configured such that the ports of the switching hub to which the different physical token ring local area networks are attached are assigned the same ring number. The token ring local area networks attached to ports of the switching hub configured with the same ring number belong to a virtual ring.

These and other aspects of the present invention will be discussed in greater detail with reference to the detailed description and the accompanying figures.

BRIEF DESCRIPTION OF THE DRAWINGS

For ease of reference, reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus for configuring and utilizing virtual token ring local area network (LAN) segments in an internetwork. In the following description, numerous specific details are set forth in order to provide a thorough understanding of the present invention. It will be apparent, however, to one skilled in the art that the present invention may be practiced without these specific details. In other instances, well-known circuits, structures and techniques have not been shown in order avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

OVERVIEW OF VIRTUAL RINGS

The present invention provides for implementation of virtual token ring local area networks ("virtual rings") in a token ring internetworking environment. A virtual ring may be comprised of a plurality of physical token ring LAN segments ("physical rings"), each of which are coupled to a unique port on a switching hub, or simply, switch. Generally, for network entities external to the switch, all of the physical rings which make up a single virtual ring appear as one single ring and are referred to with a single ring number.

Use of virtual rings offers a number of advantages. First, virtual rings allow a reduction in the number of hops, i.e., rings, by allowing grouping of multiple physical rings into a single virtual ring. As a result, it is possible to freely segment congested physical rings without concern about the hop count limit imposed in source route bridging token ring networks. In addition, each hop imposes overhead on the network; reducing the number of hops reduces data packet latency associated with each hop.

Further, by properly organizing virtual rings around logical work groups of DTEs, i.e., nodes, broadcast and multicast traffic over bridges, switches, or other media access control (MAC) layer devices, is minimized.

Still further, multiple physical rings can be concentrated into a single router subnet. As a result, the router hierarchical structure is flattened and equipment costs reduced.

A FIRST EXAMPLE OF IMPLEMENTATION OF VIRTUAL RINGS—INCREASING AVAILABLE BANDWIDTH

Figure 1A:
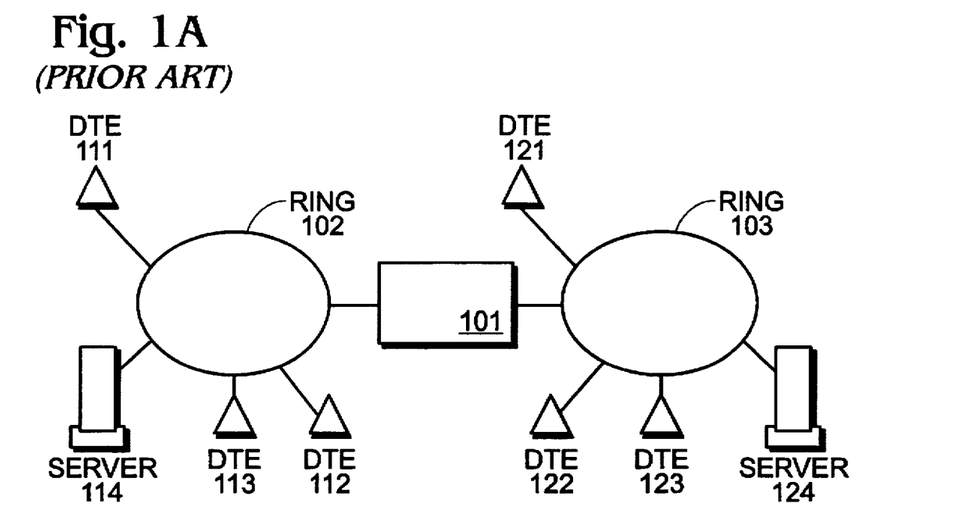
FIG. 1(a) is an illustration of a prior network including two token ring segments and a bridge.

FIG. 1(a) illustrates a prior art network having two physical rings, ring 102 and ring 103 coupled in communication with each other over a bridge 101. Bridge 101 may support transparent bridging, source routing bridging, or a combination of both—source route transparent bridging. Moreover, bridge 101 operates, for example, at the media access control (MAC) layer. Ring 102 has DTEs, i.e., stations, 111–113 and server 114 coupled with it and sharing bandwidth on the ring 102. Ring 103 has DTEs 121–123 and server 124 coupled with it and sharing bandwidth on the ring 103. It is well-known that servers can utilize significant amount of network bandwidth even to the point of making it desirable to provide a separate ring segment for the server rather than having the server share bandwidth with other DTEs on the same physical ring. However, as has been discussed above, segmenting a physical ring into two or more physical rings, and bridging traffic between them, is problematic in that establishing separate physical rings for each server in the network increases the number of rings in the network, which uses up the some of the limited number of fields for specifying ring numbers and bridge numbers in the routing information field of a source routed data packet. In addition, segmenting a physical ring into multiple physical rings causes the necessity of additional hops for stations to access the servers.

Figure 1B:
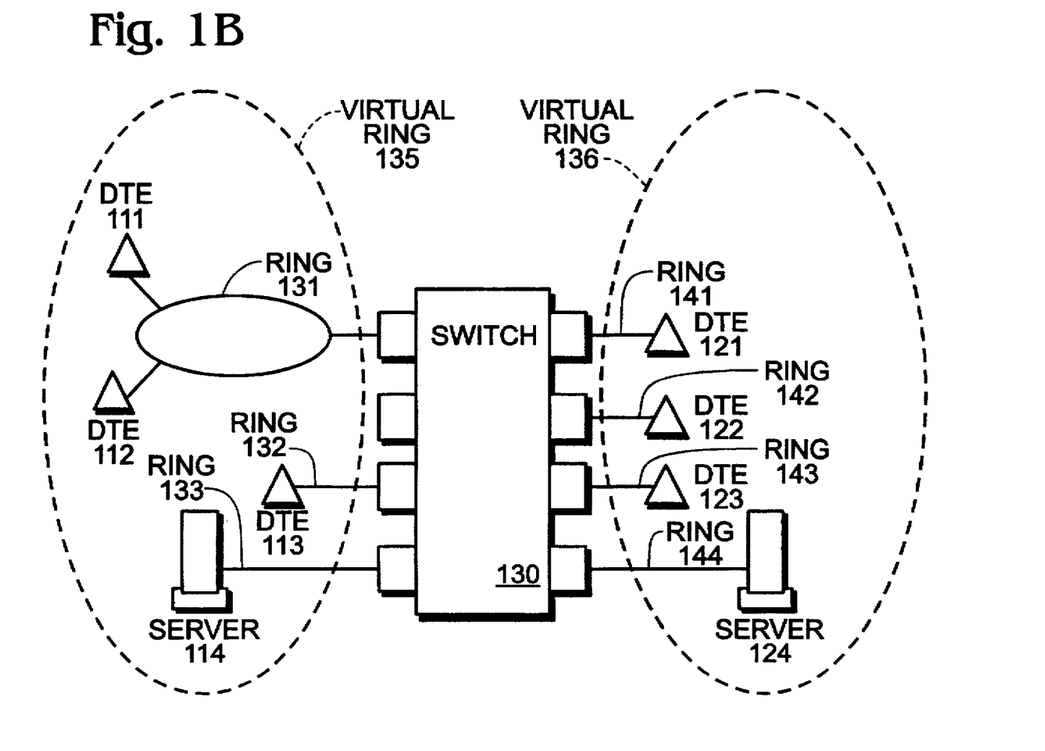
FIG. 1(b) is an illustration of an embodiment of the present invention implementing the network of FIG. 1(a) utilizing a switching hub configured to support virtual rings.

FIG. 1(b) illustrates the network of FIG. 1(a) utilizing a switching hub configured to support virtual rings. Each port on the switching hub is configured with a ring number. Those ports connected to physical rings in the same virtual ring are configured with the same ring number. In other words, all devices within a single virtual ring may be referred to with the same ring number and accessing the virtual ring utilizes only a single hop. In FIG. 1(b), virtual ring 135 is illustrated having DTEs 111–113 and server 114. However, within virtual ring 135, DTEs 111 and 112 are coupled to one physical ring 131, DTE 113 is coupled to a second physical ring 132, and server 114 is coupled to a third physical ring 133.

Similarly, virtual ring 136 is illustrated as having DTEs 121–123 and server 124. However, each of the DTEs 121–123 are illustrated as being coupled to separate physical rings 141–143 and server 124 is illustrated as being coupled to a separate physical ring 144. Virtual rings 135 and 136 are coupled in communication through switch 130. Importantly, DTEs on virtual ring 135 appear to devices on virtual ring 136 as being all on the same ring, and visa versa. This allows devices on virtual ring 135 to be referred to with a single ring number by other devices in the network. Thus, with the exception of devices 111 and 112, the devices on ring 102 illustrated in FIG. 1(a) no longer have to share bandwidth, but the number of rings in the network (and thus the number of hops) is not increased.

Broadcast and multicast traffic is reduced in the network of FIG. 1(b) through the use of virtual rings. Generally, when a port on a switch receives a multicast or broadcast data packet, a copy of the packet is made for each port out which the packet is to be transmitted. In the case of the network illustrated in FIG. 1(b), absent the virtual rings, up to six copies of a data packet would be created by switch 130 for transmission out each of its ports other than the port at which the packet was received. With the implementation of virtual rings, a single copy of a broadcast packet received at a port in virtual ring 135 is needed for transmission to the devices coupled to virtual ring 136. This is advantageous, e.g., in reducing explorer data packets in a source route bridging environment. Moreover, the effect of the network topology on unicast and multicast traffic in the network of FIG. 1(b) vis-a-vis the network of FIG. 1(a) is entirely transparent to the devices in the network. This is important, for example, when segmenting the physical ring 102 in FIG. 1(a) to the physical rings 121, 132, and 133 in FIG.(b). By configuring virtual ring 135, the segmentation of physical ring 102 is transparent from the perspective of devices 111–114.

It should be noted that internal routing of broadcast and multicast data packets between the ports of switch 130 may be accomplished, for example, as described in U.S. patent application Ser. No. 08/501,483, entitled "METHOD AND APPARATUS FOR CONTROLLING DATA FLOW WITHIN A SWITCHING DEVICE," filed Jul. 12, 1995.

Figure 2:
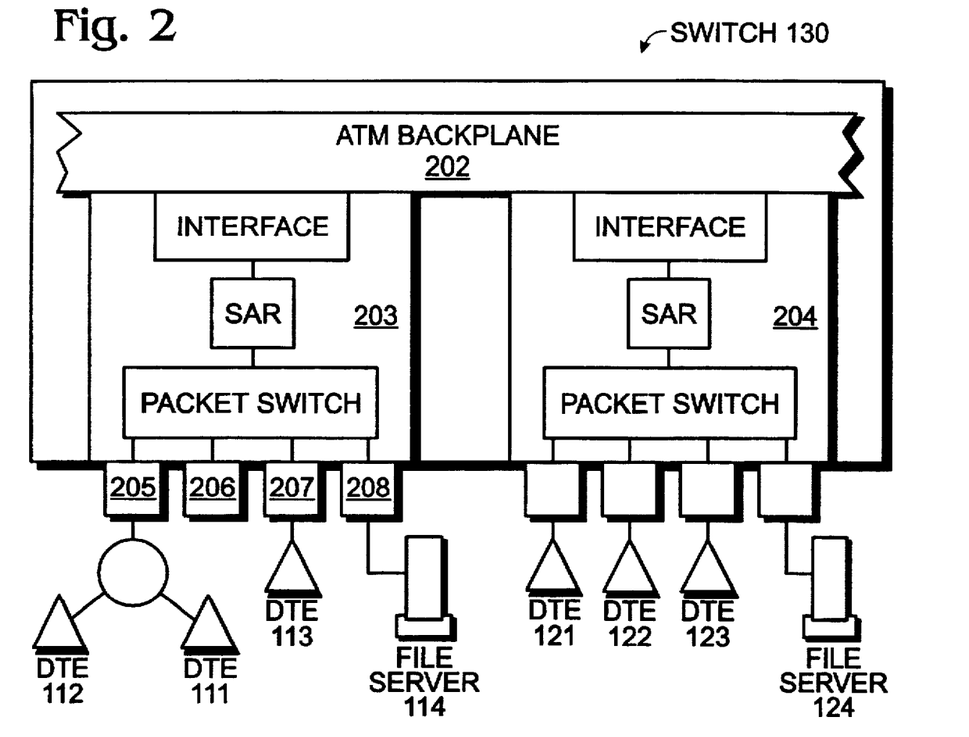
FIG. 2 is an illustration of a switch as may be utilized to implement the present invention.

FIG. 2 illustrates in greater detail the switch 130. Switch 130 may include a plurality of local area network switching modules, e.g., modules 203 and 204, each having a plurality of ports, e.g., ports 205–208 of module 203. The modules may be connected over an ATM backplane 202. The switch 130 is discussed in greater detail in copending U.S. patent application Ser. No. 08/501,537, entitled "A LAN/ATM SWITCH HAVING LOCAL PACKET SWITCHING AND AN ATM CORE FABRIC" filed on Jul. 12,1995.

A SECOND EXAMPLE OF IMPLEMENTATION OF VIRTUAL RINGS—REDUCING HOP COUNTS

Figure 3A:
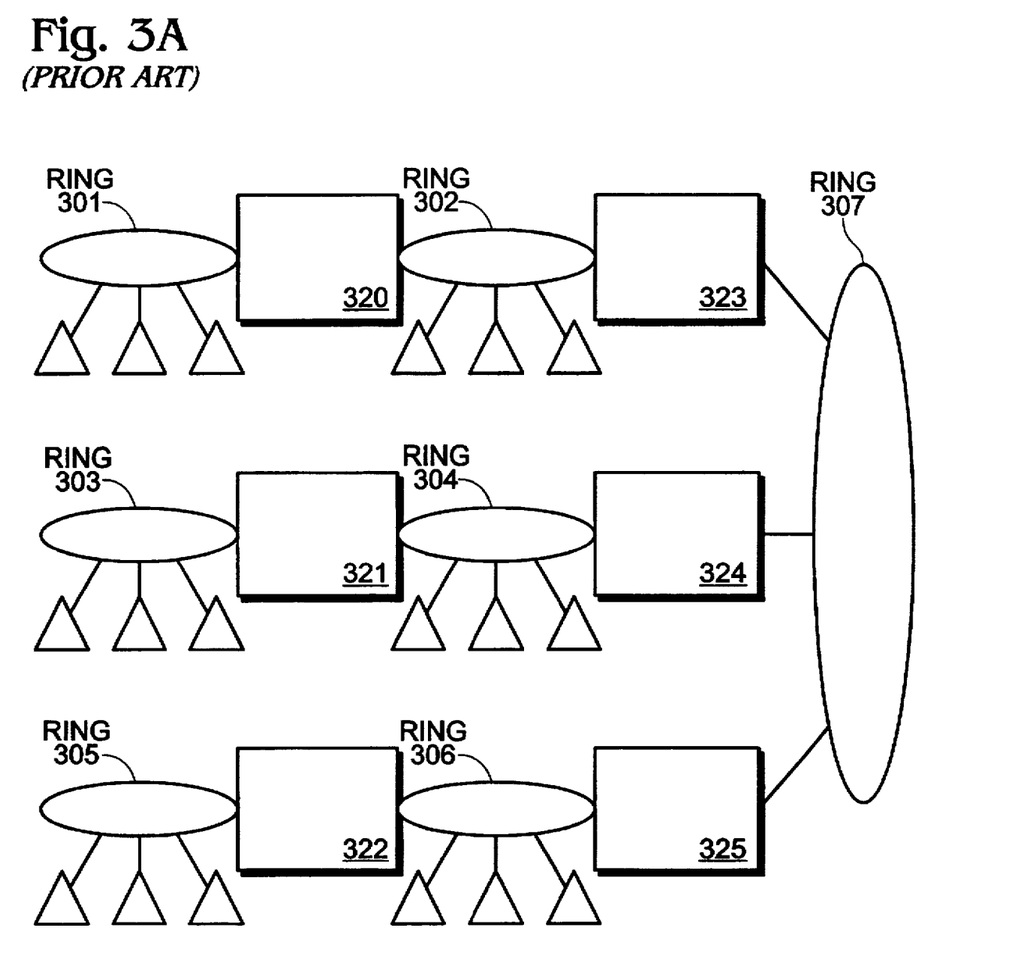
FIG. 3(a) is an illustration of a prior art network having multiple token ring LAN segments coupled in communication over bridges.

FIG. 3(a) illustrates another internetwork having multiple physical rings connected via bridges 320–325. The bridges may be either source route, transparent, or source route transparent bridges. In FIG. 3(a), physical ring 301 is coupled with physical ring 302 over bridge 320. Physical ring 303 is coupled to physical ring 304 over bridge 321. Physical ring 305 is coupled with physical ring 306 over bridge 322. Each of physical rings 302, 304 and 306 are coupled to each other through bridges 323, 324 and 325, respectively and through physical ring 307. Thus, to communicate between a DTE on physical ring 301 and a DTE on physical ring 305, the data packet must be transmitted over physical rings 301, 302, 307, 306 and 305 using up 5 out of 8 (or 13 depending on the implementation) of the available hop counts for this simple network topology. Clearly, in larger networks, the number of hops, and the limitation on hops relating to the size of the routing information field in source routed data packets, poses network management difficulties.

Figure 3B:
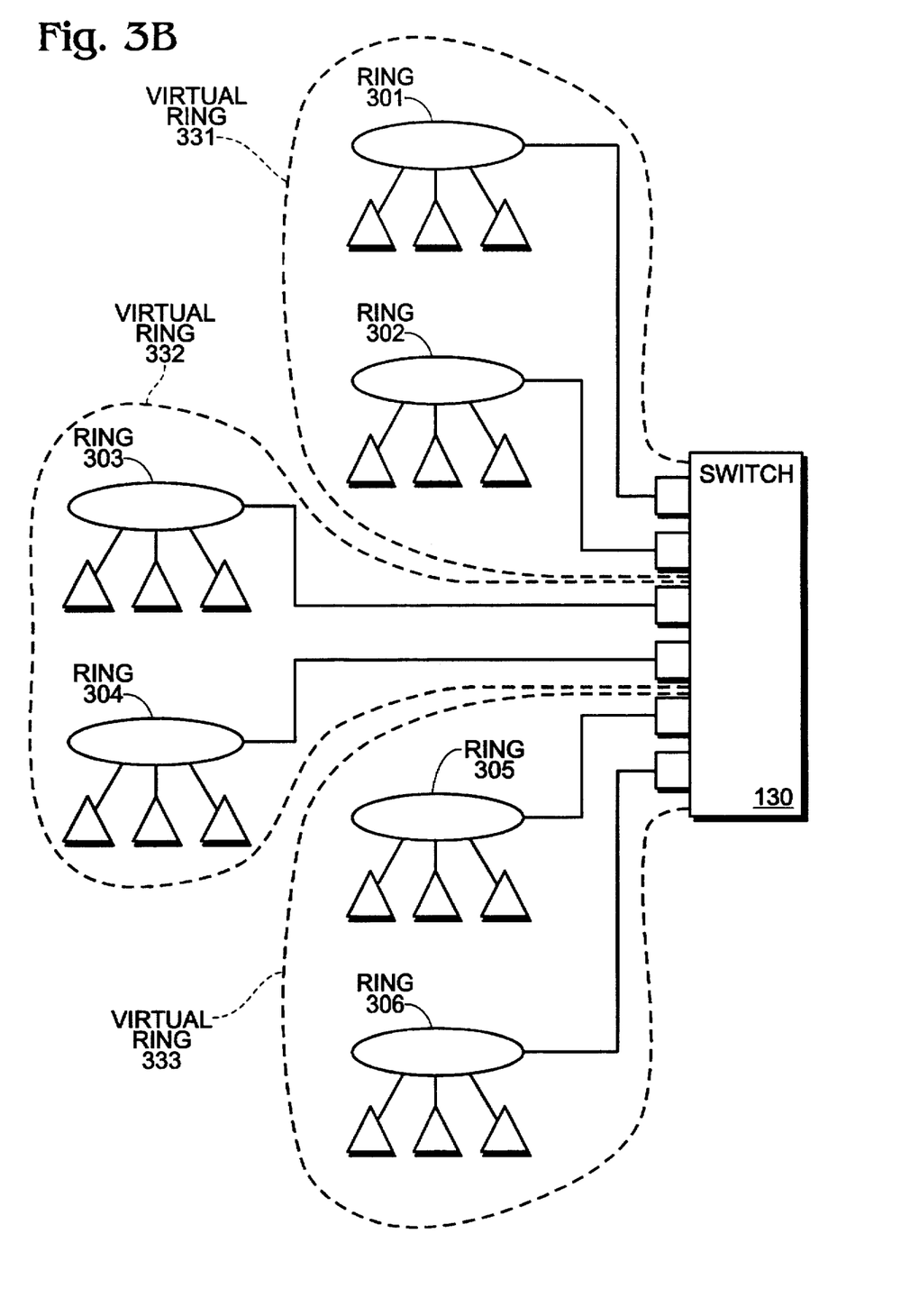
FIG. 3(b) is an illustration of an embodiment of the present invention implementing the network of FIG. 3(a) utilizing a switch supporting virtual rings.

FIG. 3(b) illustrates the network of FIG. 3(a) implemented with a switching hub utilizing virtual rings. In FIG. 3(b), physical rings 301 and 302 have been organized as a single virtual ring 331; physical rings 303 and 304 have been organized as a single virtual ring 332; and physical rings 305 and 306 having been organized as a single virtual ring 333. Thus, to communication between a DTE on physical ring 301 and a DTE on physical ring 305, as was discussed in the previous example, requires only 2 hops.

Reducing the number of hops, i.e., rings, improves network performance for at least two reasons. First, the network manager may more freely segment congested rings. Second, latency is decreased with each hop that is eliminated.

A THIRD EXAMPLE OF IMPLEMENTATION OF VIRTUAL RINGS—REDUCING THE NUMBER OF REQUIRED ROUTER PORTS

Figure 4A:
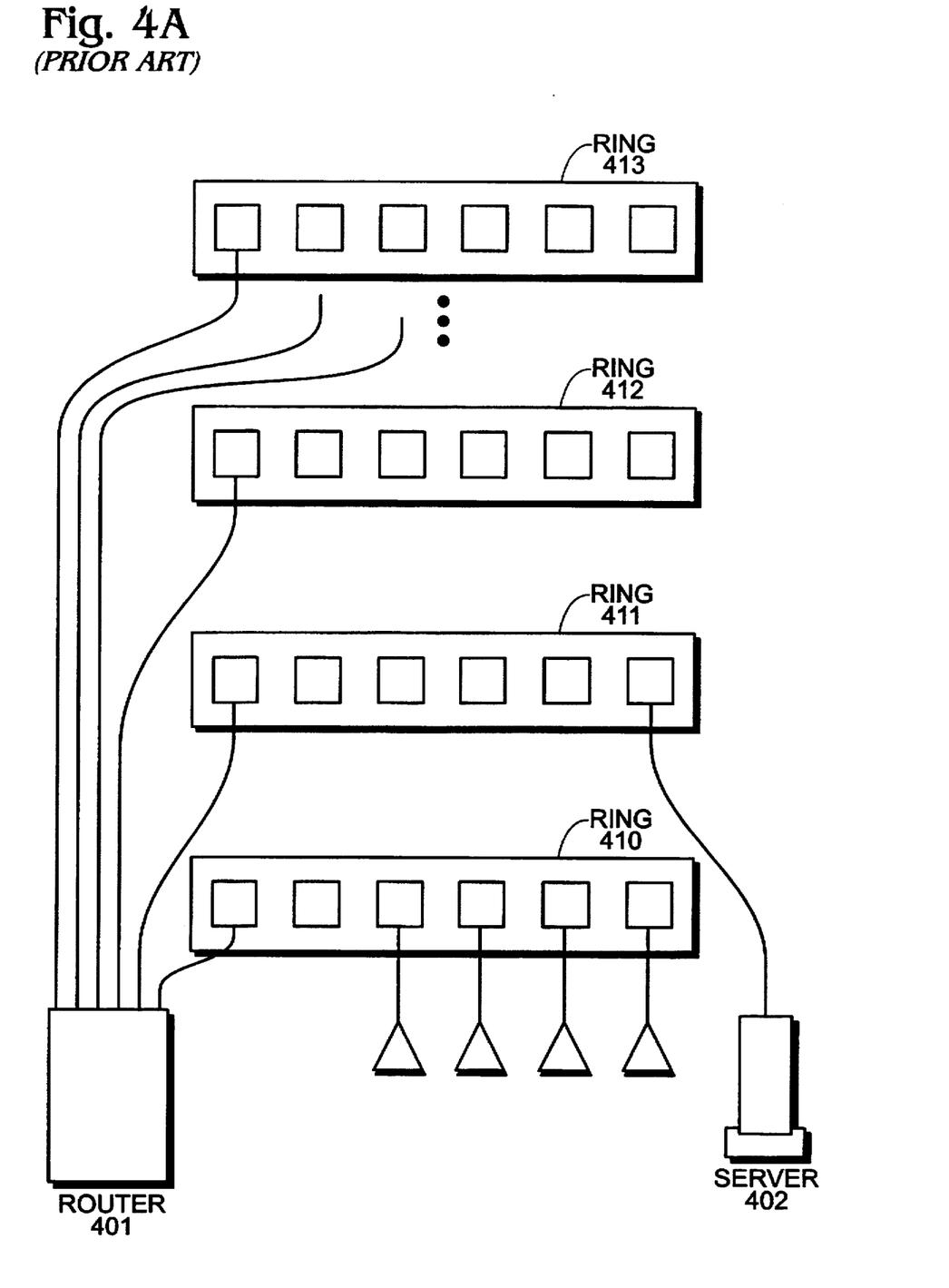
FIG. 4(a) is an illustration of a prior art network having multiple token ring segments coupled in communication over bridges.

FIG. 4(a) illustrates a network having a router 401. The router is coupled to physical token ring segments 410–413 using one router port per ring.

Figure 4B:
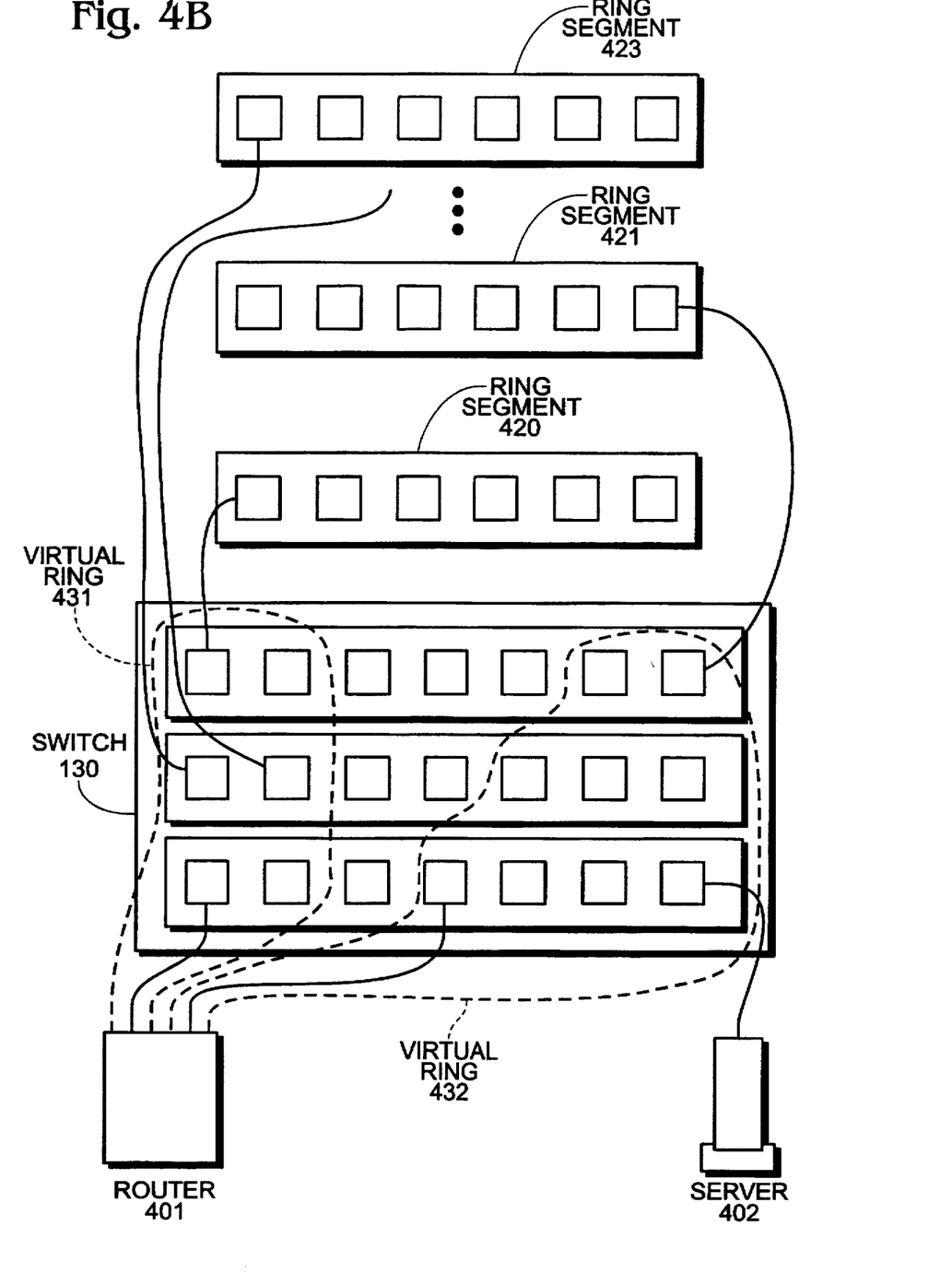
FIG. 4(b) is an illustration of an embodiment of the present invention implementing the network of FIG. 4(a) utilizing virtual rings.

FIG. 4(b) illustrates the network of FIG. 4(a) implementing virtual rings using switch 130. A first virtual ring 431 is configured comprising physical rings 420 and 423. A second virtual ring 432 is configured which allows communication with server 402 and physical ring 421. Thus, the number of router ports utilized is reduced from one per physical ring to one per virtual ring.

Thus, as can be seen, use of virtual rings in the present invention provides for significant advantages over prior art techniques.

A FOURTH EXAMPLE OF IMPLEMENTATION OF VIRTUAL RINGS—IMPLEMENTATION OF VIRTUAL RINGS THROUGH AN ATM CLOUD

Figure 5:
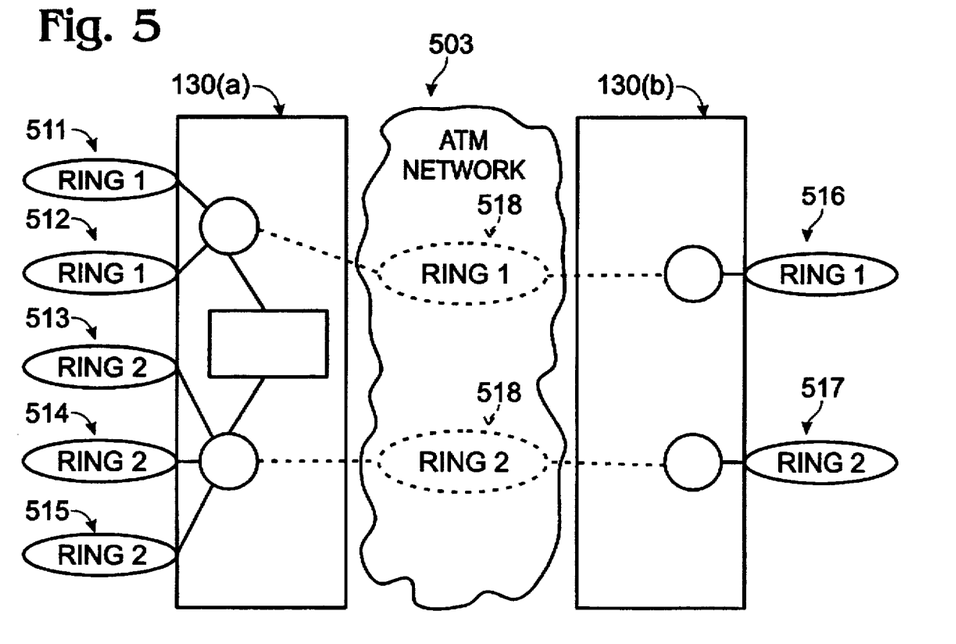
FIG. 5 illustrates use of virtual rings across an ATM cloud.

FIG. 5 illustrates a further implementation of the present invention's virtual ring. In FIG. 5, two switches 130(a) and 130(b) are coupled in communication with each other over ATM cloud 503. Physical rings 511 and 512 (connected with switch 130(a)), physical ring 516 (connected with switch 130(b)) and logical ring 518 in the ATM cloud 503 all comprise one virtual ring. A second virtual ring is comprised of physical rings 513, 514 and 515 connected with switch 130(a), physical ring 517 connected with switch 130(b) and logical ring 518 in the ATM cloud. The virtual rings are connected through a bridge on switch 130(a).

IMPLEMENTATION OF VIRTUAL LANS BY THE NETWORK MANAGER

In the present invention, a network manager may define token ring numbers by designating in a management screen, on a per port basis, a ring number for each port. If the manager assigns the same ring number to multiple ports, then all physical token rings on those ports are part of the same virtual ring.

ALTERNATIVES TO THE PREFERRED EMBODIMENT OF THE PRESENT INVENTION

There are, of course, alternatives to the described embodiment which are within the reach of one of ordinary skill in the relevant art. The present invention is intended to be limited only by the claims presented below.

Thus, what has been disclosed is a method and apparatus configuring and utilizing virtual segments in a local area network.

What is claimed is:

1. A virtual token ring network, comprising:
a first physical token ring segment and a second physical token ring segment, said first physical token ring segment coupled to a first port of a central device, said second physical token ring segment coupled to a second port of said central device, said central device grouping said first physical token ring segment and said second physical token ring segment as a single virtual token ring by assigning an identical token ring number to the first and second ports.

2. A virtual token ring local area network (LAN) comprising:

a network device having a first port and a second port;

a first physical token ring LAN coupled in communication with the first port;

a second physical token ring LAN coupled in communication with the second port; and, a ring number assigned to the first port and the second port such that the first physical token ring LAN and the second physical token ring LAN are in the virtual token ring LAN.

3. The virtual token ring LAN of claim 2 wherein the network device is a source route bridge.

4. The virtual token ring LAN of claim 2 wherein the network device is a transparent bridge.

5. The virtual token ring LAN of claim 2 wherein the network device is a source route transparent bridge.

6. The virtual token ring LAN of claim 2 wherein the network device is a switching hub.

7. A virtual token ring network, comprising:

a first token ring segment;

a second token ring segment;

a media access control (MAC) layer device, the device having a first port coupled to the first token ring segment and a second port coupled to the second token ring segment, the first port and the second port assigned to the same ring number.

8. The virtual token ring network of claim 7, wherein the first token ring segment includes a logical token ring segment.

9. The virtual token ring network of claim 8, wherein the logical token ring segment includes a wide area network (WAN).

10. The virtual token ring network of claim 9, wherein the WAN includes an asynchronous transfer mode (ATM) network.

11. A virtual token ring local area network, comprising:

a first token ring segment;

a second token ring segment;

a first switch having a first port coupled to the first token ring segment and a second port coupled to the second token ring segment;

a third token ring segment;

a second switch having a first port coupled to the second token ring segment and a second port coupled to the third token ring segment, the first, second and third token ring segments grouped as a single virtual token ring local area network wherein the first port, second port of the first switch, third port and fourth port of the second switch, are assigned an identical ring number.

* * * * *